Figure 1:
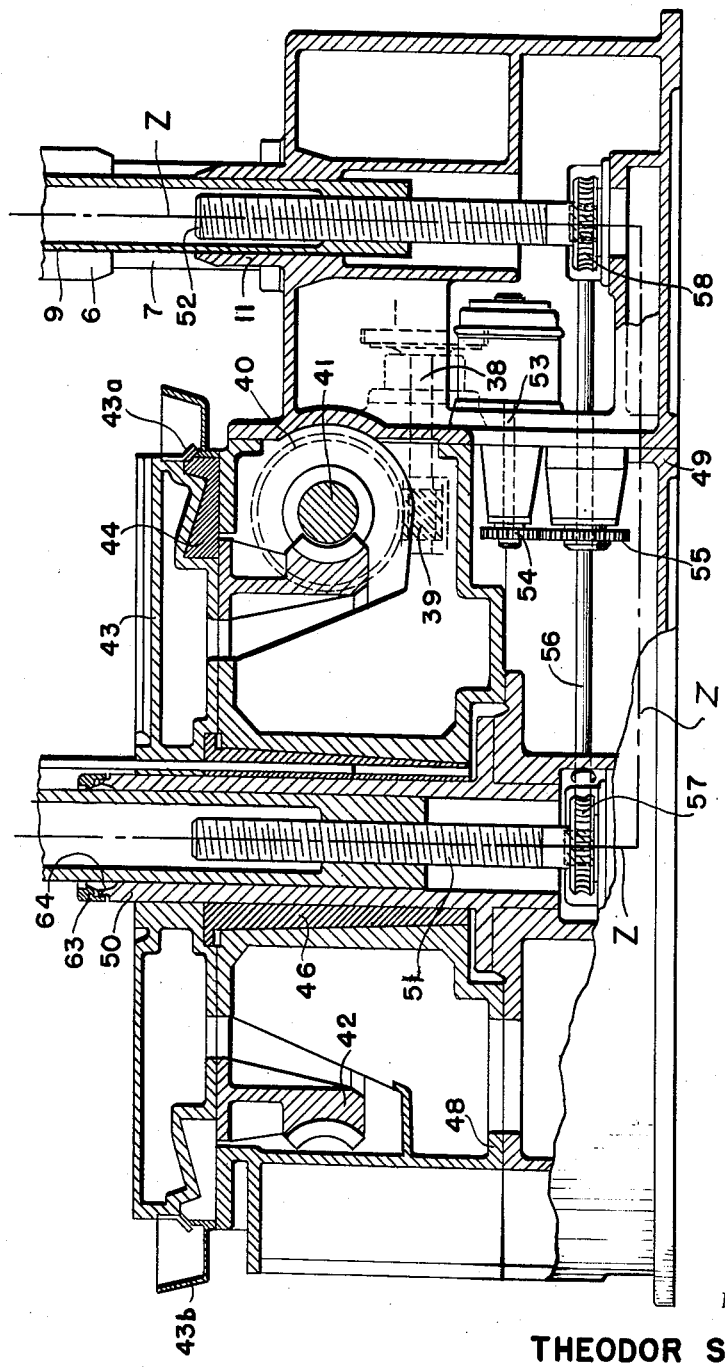

June 8, 1954

T. SAXER 2,680,399

MILLING MACHINE

Filed Feb. 17, 1948

7 Sheets-Sheet 1

INVENTOR

THEODOR SAXER

BY *Young, Emery & Thompson*

ATTORNEYS

June 8, 1954 T. SAXER 2,680,399
MILLING MACHINE
Filed Feb. 17, 1948 7 Sheets-Sheet 2
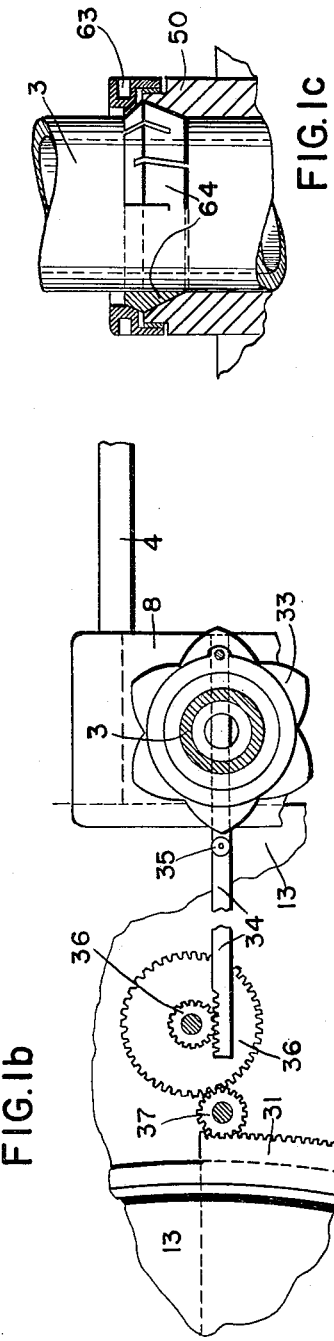
INVENTOR
THEODOR SAXER
BY
ATTORNEYS

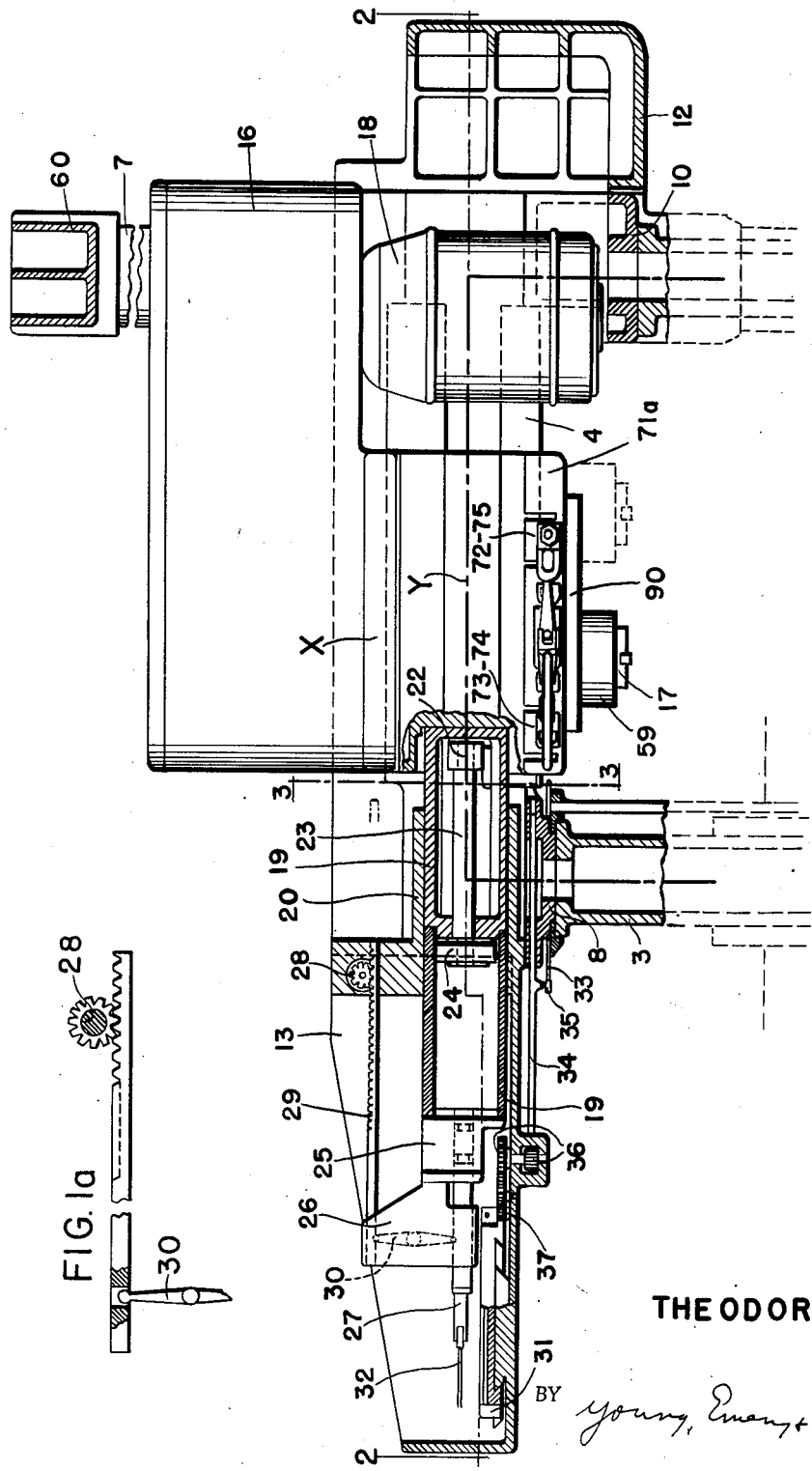

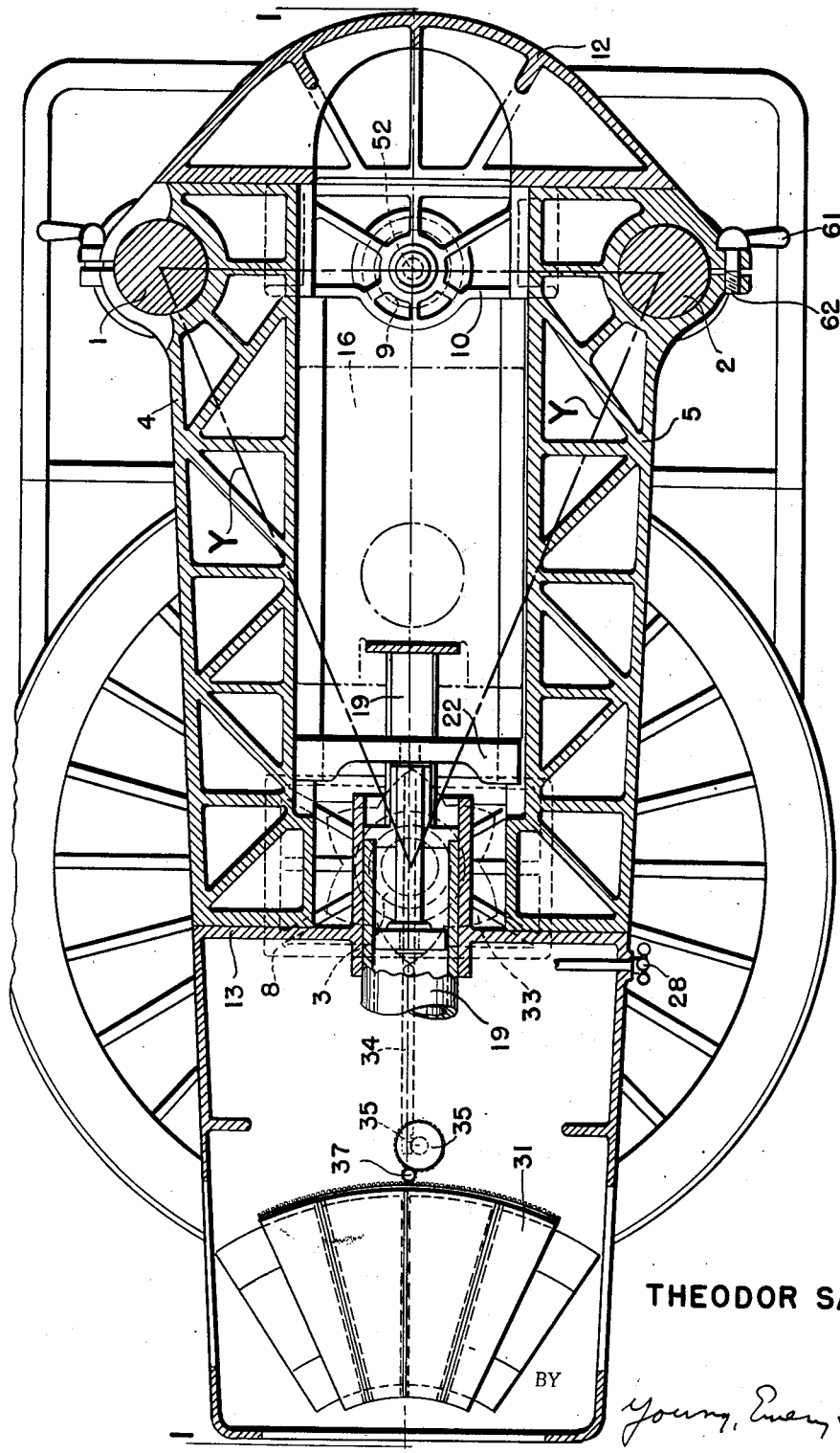

June 8, 1954

T. SAXER 2,680,399

MILLING MACHINE

Filed Feb. 17, 1948

7 Sheets-Sheet 5

INVENTOR
THEODOR SAXER

BY Young, Emery & Thompson
ATTORNEYS

June 8, 1954  T. SAXER  2,680,399
MILLING MACHINE
Filed Feb. 17, 1948  7 Sheets-Sheet 6

INVENTOR
THEODOR SAXER
BY Young, Emery & Thompson
ATTORNEYS

June 8, 1954  T. SAXER  2,680,399
MILLING MACHINE
Filed Feb. 17, 1948                                    7 Sheets-Sheet 7
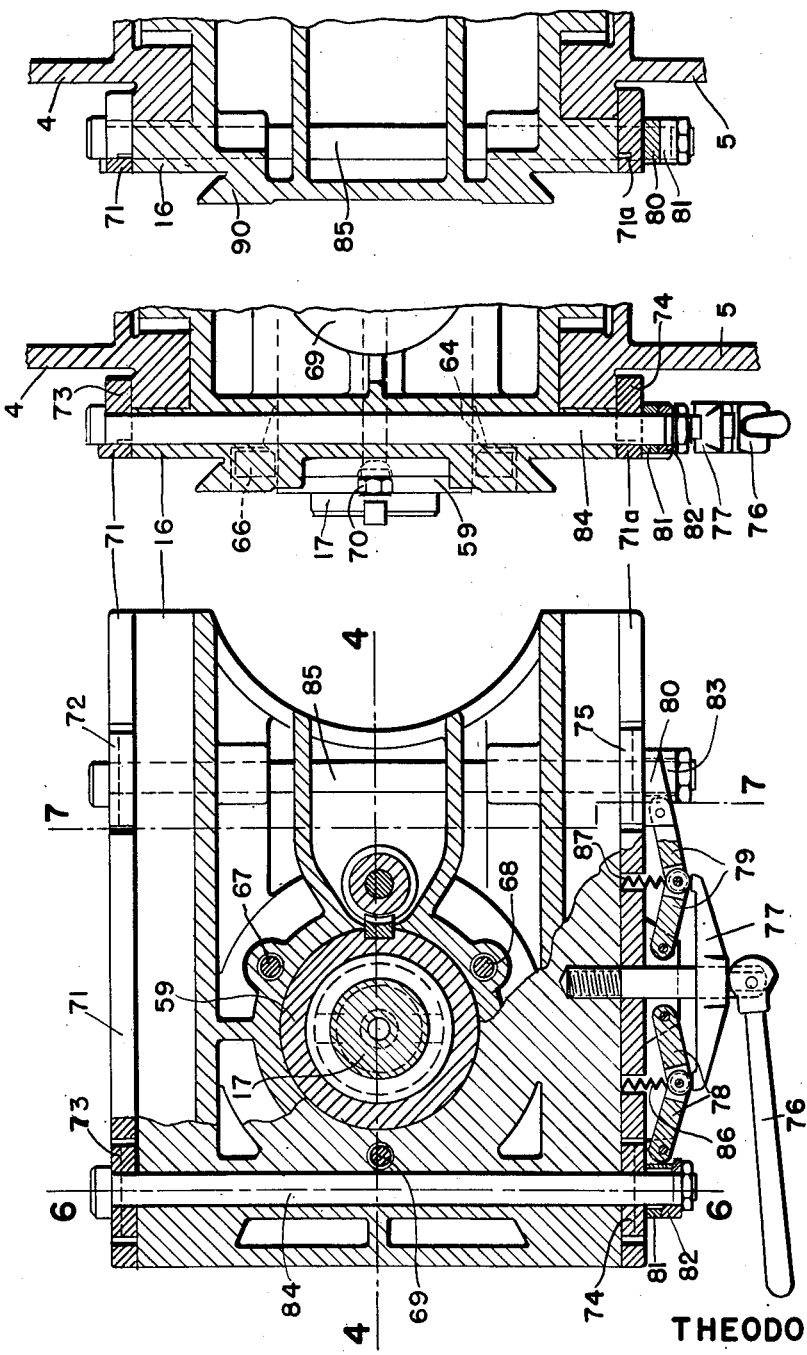
INVENTOR
THEODOR SAXER
BY
Young, Emery & Thompson
ATTORNEYS

Patented June 8, 1954

2,680,399

UNITED STATES PATENT OFFICE 2,680,399

MILLING MACHINE

Theodor Saxer, Rorschach, Switzerland

Application February 17, 1948, Serial No. 8,971

Claims priority, application Switzerland
March 15, 1947

7 Claims. (Cl. 90—13.4)

The present invention relates to a machine tool and more particularly to a milling machine.

The best known machine tool, i. e. a milling machine for producing flat surfaces, is of the so-called bracket type. This modern construction is a natural consequence of its development, since an endeavour has been made to obtain as universal an application as possible. This has led to the known movability of the worktable in three directions, vertically, longitudinally and transversely. The bracket type milling machine, however, possesses the following drawbacks:

Because of the movability of the worktable in three directions, it is impossible to avoid a certain yielding of the entire structure, on the one hand because of the necessary running play in the three straight guides arranged one over the other: (a) of the bracket table perpendicular to the column, (b) of the cross-slide horizontal to the bracket table, and (c) of the milling table, horizontal but at right angles to the direction of motion of the cross-slide on the underside; and on the other hand a dangerous tipping moment arises because of the great height of the machine, for instance from the supporting surface of the cross-slide to the upper edge of the worktable. However, supporting the worktable above and/or at both sides makes it impossible to produce accurately plane or rectangular surfaces, either with a horizontal or with a vertical milling spindle, machining being done in the first case according to the cylindrical cutting method and in the latter case according to the face cutting method.

In addition, it must be stated that the cylindrical cutting method is unsuitable for machining an absolutely plane surface. It is known that a so-called "comma" chip is formed with the cylindrical cutter, and that it has an irregular cross-section. A consequence of this is the bending of the milling spindle and blunting of the cutter. The irregular loading of the milling cutter causes, through the components of the cutting force, an unsteady working (vibrations) and badly finished surfaces. In addition, a cylindrical cutter cannot be made to run exactly circular since there must necessarily be some play between the bore and the milling spindle. In this way the unavoidable so-called "feed marks" arise, and the machined surface becomes wavy. In a bracket milling machine, it is the horizontal milling spindle that needs attention since the milling work is carried out principally with cylindrical cutters.

In order to eliminate the above-mentioned drawbacks, the accurate machining of surfaces may only be carried out by the face cutting method. In reality however, this is erroneous, since face milling is actually a circular planing as the tool used carries knives, each of which works under exactly the same conditions as a planing tool. The holding and the shaping of the knives is the same as that of the planing tools.

The cutting operation with a circular planing tool is ideal, since it produces no irregular load on the cutter. In addition, the tool rests directly on the nose of the working spindle, consequently close to the support, and it is exactly centered and—what is still more important—has a good flat support on the end surface of the working spindle. If such circular planing tools are adopted, in which each separate knife or tool can be adjusted in height in accordance with a sensitive measuring dial gauge, accurate to plane running, a perfect surface will thereby be obtained, both as regards evenness and finish. This circular planing tool, or the separate cutting tools, must of course be capable of being adjusted when the tool is mounted on the working spindle. The cylindrical cutter, however, must be used as a tool with copying milling.

Figure 3:
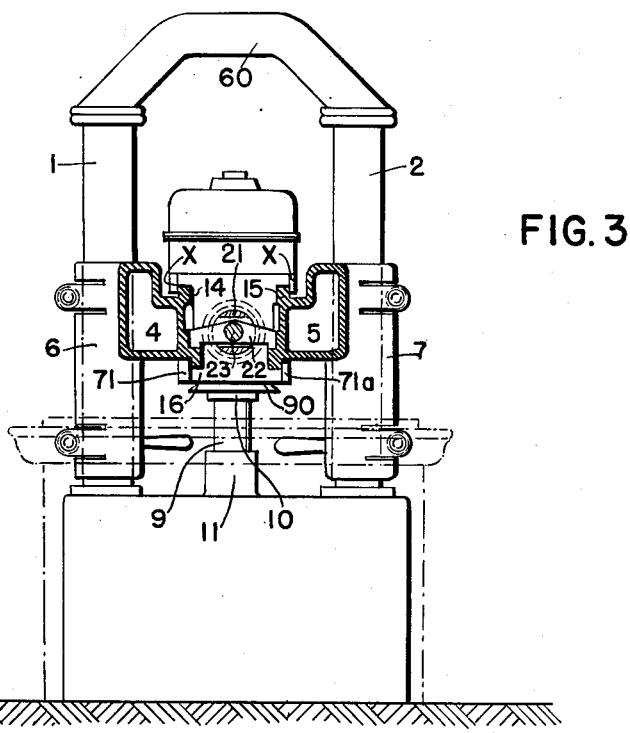
Figure 4:
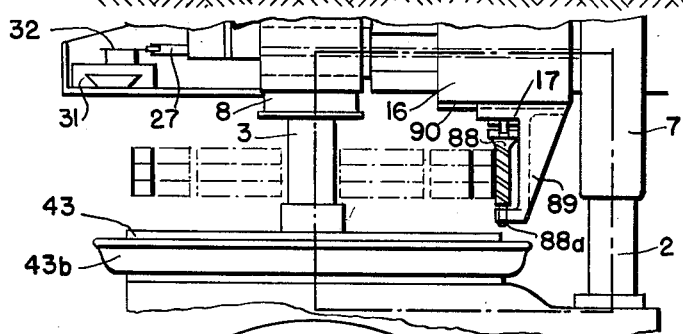
Figure 5:
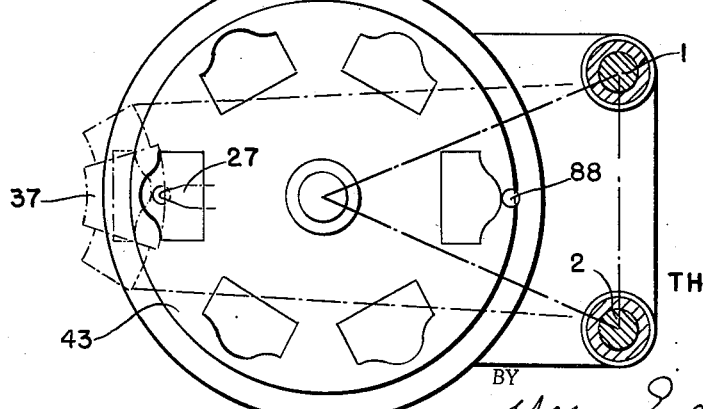
Figure 6:
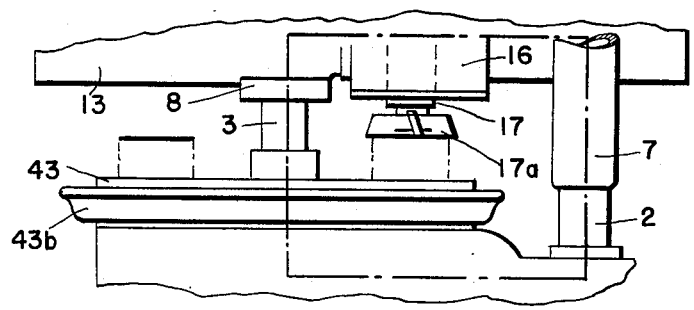
Figure 7:
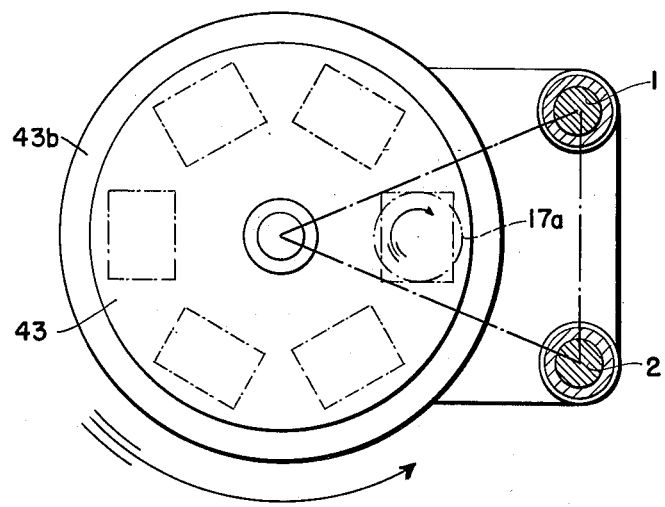
Figure 8:
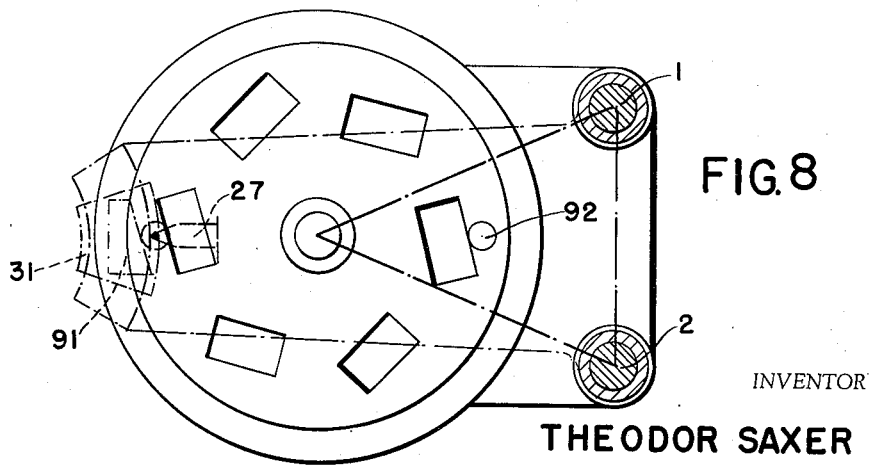

Further features of the invention will be apparent from the drawing, in which one form of execution of the machine is illustrated purely by way of an example and in which;

Figs. 1 and 1d are longitudinal sections of the machine taken on line 1—1 of Fig. 2, Fig. 1a is a side view partly in section showing movement of the templet, Fig. 1b is a plan view of the detail of a connection to the clamping members, Fig. 1c is a side view partly in section of the column of the machine, Fig. 2 is a partial plan view and cross-section with the latter taken on line 2—2 of Fig. 1, Fig. 3 is a vertical section taken on line 3—3 of Fig. 1, Figs. 4 and 5 are diagrammatic views showing a working example of continuous copying milling of curved surfaces on workpieces, for example bearing caps, Figs. 6 and 7 are diagrammatic views showing a working example of continuous circular planing of flat surfaces on workpieces, for instance on gray cast-iron casings, Fig. 8 is a diagrammatic view showing a working example of the continuous cylindrical planing of a straight end surface on workpieces, for example on steel bars, Fig. 9 is a sectional view showing the concentric clamping of the withdrawable milling spindle bushing taken on line 4—4 of Fig. 10, Fig. 10 is a sectional view showing the central clamping of the milling spindle casing taken on line 5—5 of Fig. 9, Fig. 10a is a sectional view taken on line 6—6 of Fig. 10, and Fig. 10b is a sectional view taken on line 7—7 of Fig. 10.

The machine illustrated by way of example in Figs. 1–3 shows clearly the special main features of the rigid type of construction which forms the object of the invention. A force-connection (y) in a frame in the horizontal direction and a corresponding force-connection (z) in the vertical direction, are formed with the machine bed through two main columns 1 and 2—which could as well be replaced by one or two guide columns—and a central auxiliary column 3, which are connected to each other by means of left and right holders 4 and 5 with guides 6 and 7. It is also shown in the illustrated execution, the yoke 60 (Figs. 1 and 3) which joins the two main columns 1 and 2 to form a closed frame with the bed. The holders 4 and 5 are connected together on the one hand by a support 8 forming one piece with the central auxiliary column 3, and on the other hand by a connecting support 10 forming one piece with a vertically adjustable column 9. The column 9 is guided by a tube 11. At the ends, to the right and left in Figs. 1 and 2, the holders 4 and 5 are fixed together by transverse member 12 and an overhung piece 13.

Each of the holders 4 and 5 has a guide track 14 and 15 for the central guide of a working spindle casing 16. A working spindle 17 is driven by a motor 18 by means of gear wheels, not shown, imparting various speeds corresponding to the material being machined, for instance steel or light metal.

Holders with a guide track on one side are known, whereby a drive shaft projects through the holder. Apart from a weakening in cross-section there is a one-sided loading of the working spindle and consequently a dangerous tipping moment arises.

As an object of the present invention, the working spindle casing 16 slides not only between its guide tracks 14 and 15, but in addition in a circular slide guide 20 of the overhanging piece 13. In this case the guide function is taken up by the guide tube 20, which forms a part of the overhanging piece 13. In addition a hydraulic cylinder 19 is formed as an additional circular guide column for the working spindle casing 16. The connection for the hydraulic cylinder 19 to the working spindle casing 16 is formed with the aid of a connecting piece 21 which is firmly bolted at one side to the end of the working spindle casing 16, and on the other side formed as a cylinder cover 21a firmly connected to the cylinder 19. From Fig. 3 it can be seen that the connecting piece 21 is cut through to form a slot through which the piston rod holder 22 projects, which is arranged at the end of the piston rod 23. The piston rod holder 22 is firmly connected to the holders 4 and 5 which maintains the piston rod 23, and the piston connected with it, in place. The above-mentioned slot is of such dimensions that it allows a working passage for the working spindle casing 16. In the present case the piston rod holder 22 forms an additional stiffening means for the holders 4 and 5.

On the side of the cylinder jacket 19 away from casing 16 a control cell 25 is provided, formed as a closing cover and located in the extension of the axis of the cylinder; in its turn—also in the same axis—it is in operative connection with a contact bolt casing 26. Thus, if a contact bolt 27 is operated either manually through the return motion with a start handle 28, toothed rack 29, lever 30, or mechanically or hydraulically with the aid of a control or copying templet 32, oil being introduced through the control cell 25 into the chamber of the cylinder 19 at the left or at the right of the piston: there results a reciprocating motion of the working spindle casing 16. The method of operation of a double sided control piston in the control cell 25 is known and requires no further explanation.

In the following it will be described how the working spindle casing 16 is directly controlled, in contrast to the known type of continuous copying milling machine, in which a workpiece table and a circular templet table are provided and both are operatively connected. The drawbacks of such an arrangement are the following:

Apart from the large amount of space and material required with two circular tables arranged beside each other, there is a greater distance from the middle of the tool to the middle of the feeler member, corresponding to the distance from the middle of the workpiece to the middle of the circular templet table. For controlling the tool, i. e. the control cell in connection with the work slide, which in its turn introduces the working motion, a so-called roller slide or a yoke-like connection from the roller slide to the control cell is necessary. The length of this yoke-like connection corresponds approximately to the above-mentioned distance from the middle of the templet to the middle of the circular workpiece table. In spite of the great rigidity of the yoke, it is hardly possible to avoid a certain yielding; thereby the starting of the movement is delayed, and/or the reversing error connected with it is increased, thus adversely affecting the accuracy of the shape of the workpiece as compared with the templet. In addition, with the above-mentioned method, the number of copying templets fitted on the circular templet table must of course be exactly the same as the number of workpieces on the circular workpiece table, which means high costs for templets and for setting are necessary.

In the machine according to this invention these drawbacks are obviated by the arrangement of the contact bolt 27, with its contact bolt casing 26 and control cell 25 in the extension of the axis of the cylinder 19, creating direct control, i. e. eliminating the long yoke and thus making the reversing error as small as possible.

The work table 43 is designed as a circular table. In order to make it possible that only one single copying or control templet is required for machining several workpieces arranged on the worktable, in accordance with the invention, a circular templet table segment 31 is provided which carries the copying or control templet 32.

The circular templet table segment 31 is controlled from the circular workpiece table 43 and in a sequence corresponding to the number of workpieces. An operating templet 33, rotating in the same direction and with the same peripheral speed and driven by the circular workpiece table 43, is shaped so that it imparts to the circular templet table segment 31 a positive reciprocating movement in such a way that, if the worktable 43 carries for instance six workpieces, the round templet table segment 31 moves six times forwards and six times backwards with the copying or control templet 32, which has a shape corresponding to the workpieces. The reciprocation of the segment may, according to requirements, be regular or irregular. The return motion takes place each time in the space between the adjacent workpieces. The operating templet 33 communicates its movements to a roller 35 fixed to a toothed rack 34; so that the rack 34 transmits its reciprocating longitudinal motion over gears 36 and 37 to the circular templet table segment 31, in such a way that the latter makes the above-mentioned sequential oscillating circular motion along therewith. Naturally this movement can be carried out mechanically or hydraulically by suitable transmission members.

By means of the circular worktable a continuous machining of workpieces can be suitably carried out, also in connection with the copying control device.

With the continuous working methods hitherto known, the circular worktable was loaded with the greatest possible number of workpieces and the devices required therefor, but by the present invention the number of workpieces or devices applied is reduced to agree with the total number of workpieces so that also a small number of pieces can be machined economically without large equipment costs.

The idle passage from one workpiece to the next is made at high speed.

The circular workpiece table 43 is driven by the following members: An adjustable stepped gear drives a shaft 38, on the end of which a worm 39 is in engagement with a gear 40. These driving members 39 and 40 may have their teeth cut in accordance with requirements, i. e. with one, two or more teeth and may be interchanged one for another. In this way a large range of feed and/or high-speed motion is obtained. On the same axis with the gear 40, the main driving worm gear 41 is driven by the gear 40, which is large in diameter relative to the workpiece table 43. Thus the workpiece table 43 is driven by the main driving worm gear 41.

The bearing of the circular workpiece table as such, and the manner in which it is finished, are in the arrangement of the parts ideal, particularly with regard to the cutting forces that occur, as also with regard to the automatic chip guard, since nothing can fall down and the chips are guided by a special coverplate 43a into a tray 43b. A V-shaped, hardened and ground guide ring 44 is fixed on the surface of the table, which is perfectly flat. The guide track of the table 43 is similar in shape to the V-guide 44, the thickness of the oil film necessary for lubrication being taken into consideration. The gear 40 is designed so that the worktable cannot be raised up or out. A middle guide for the table 43 is provided with a bushing 46 having a cylindrical bore and tapered exterior. The circular table 43 rests wholly on the stationary bed parts 48 and 49 respectively.

A two-sided overhang as in bracket machines is avoided in spite of, or because of the endless table-movement. The above-mentioned auxiliary column 3 is guided in the bore of the standpipe or column 50, which is rigidly connected to the bed part 49.

Two lifting spindles 51 and 52 are provided for the coarse adjustment in height of the working spindle casing 16; these spindles having a screw connection with the nut parts which are provided in the middle auxiliary column 3 and the lifting column 9. The lifting spindles 51 and 52 are driven by a motor by means of gears 54 and 55 in the middle part of the shaft 56. On each of the ends of the shaft 56, a worm gear is provided which is in mesh with the worm gears 57 and 58. The lifting spindles 51 and 52 with the said worm gears 57 and 58 respectively are rotatably supported in the fixed bed part 49 and held by axial bearings.

A fine or chip adjustment is made with the spindle sleeve 59 (Figs. 1, 9 and 10), which can be withdrawn axially. When the height adjustment has been made, the guide tubes 6 and 7 of the holders 4 and 5 are firmly clamped to the main columns 1 and 2, this being carried out at locations as far apart as possible. The tubes are slotted in such a way that an effective strap-clamping is attained. A lever 61 and a screw member 62 serve for clamping but it is obvious that the clamping could also be performed hydraulically from a central position. The middle auxiliary column 3 is also concentrically clamped by means of a nut 63a and a collet 64a. A safety device may be provided, in that, with the aid of suitable electric limit contacts, the motors for control of the lifting movement can only be started when the clamps have been loosened.

When the work to be carried out is the continual circular planing of very accurate flat surfaces, in addition to the clamping described above, the spindle sleeve 59 and the working spindle casing 16 are also clamped.

Spindle sleeve clampings of different types are known and all of them have the drawback that they do not clamp concentrically and thus adversely affect the exact plane running of the circular planing tool.

The clamp of a spindle sleeve as illustrated in Fig. 9 fulfills this requirement as follows:

At two positions of the spindle sleeve 59 some distance apart from each other, collets 63a and 64a are arranged. Each of the two collets surrounds the spindle sleeve with an annular surface. The ends of the collets are tapered. The clamps are shown in Fig. 9 in relation to the center M of the circumference with the radius R. The position of the spherical center lies in the middle M between the two ends, as can be seen from the drawing. The rings 65 and 66 fit on to the ball-shaped ends. A connection of the rings is effected with three bolts 67, 68 and 69 (Figs. 10). The ends of the bolts are formed as spherical discs and/or the rings as spherical cups, thus imparting an equalization of pressure. With the aid of a nut 70 on one of the bolts 69, which nut may for instance also be a lever and its end also spherical, a central concentric and self-regulating clamping is effected, which of course can also be loosened. In the present machine, as regards the method of clamping, neither the sleeve nor the member surrounding it is slotted.

As shown in Fig. 10, central clamping of the working spindle casing 16 is effected as follows:

Each of the two guide rails 71 and 71a (Figs. 3, 10, 10a and 10b) have two clamping positions 72, 73, 74 and 75, which are not quite cut through, and therefore yielding. These are arranged in positions which are some distance apart, as mentioned above. Simultaneous clamping of the said clamping positions takes place centrally, and in fact by moving the toggle levers 78 and 79, one acting at each side which are in operative connection with tapered washers 80 and 81. In their turn, as can be clearly seen from Fig. 10, these tapered washers effect a drawing together of the four clamping positions with the aid of counter-pieces 82 and 83 and/or bolts 84 and 85 which carry collars and/or nuts at both ends. Loosening is effected by reversing the direction of movement of the lever 76. The springs 86 and 87 also ensure certain loosening.

The work example according to Fig. 4 shows the supporting of the cylindrical milling cutter 88 at its free end with the aid of a supporting arm 89, this arm being fixed for instance to the dovetail part 90 of the working spindle casing 16 (Fig. 3). The cylindrical milling cutter is a welded construction (high-speed steel for the milling cutter and/or unalloyed steel for the shaft), and thus forms one piece, i. e. no toe pin being necessary, so that faultless circular running can be ensured. At one end the supporting cone (Fig. 4) is provided with the operating flange of the working spindle 17, and at the other end an auxiliary supporting pin 88a, is carried in the supporting arm 89.

The example according to Figs. 6 and 7 shows continual circular planing with a so-called circular planing tool 17a. When Figs. 6 and 7 are considered, a detailed description of the operation is not required.

In the example according to Fig. 8, the continuous milling of plane surfaces according to the cylindrical milling method is shown. From the drawing the arrangement (oblique position) of the workpieces can be seen. The control templet 91 is in a similar position. The oblique position certainly enables control of the hydraulic motion, caused by the templet 91, to take place, i. e. that the tool 92 is correspondingly moved, whereby no reversing of the hydraulic motion takes place and consequently an absolutely straight surface is produced.

The example according to Fig. 8 is a contrast to the example shown in Figs. 4 and 5, where the hydraulic motion controls, according to the templet in the first half rising and in the second half falling, the workpieces being thus machined continually according to the cylindric milling method with curved surface.

To sum up, it should be mentioned that with the described machine in the case of circular planing and copying milling, taking into consideration the spaced clamping of all the members in connection herewith, working absolutely free from vibration is ensured, and the above-mentioned chief feature enables the tools to remain effective for a longer time, especially when circular planing tools tipped with sintered carbide, are used, whether cutting negatively or positively, and absolutely plane surfaces, as well as curved surfaces, can be produced by the circular milling method.

I claim:

1. A milling machine comprising a frame, a table bed mounted on the frame, a round work table rotatably arranged on said table bed, said frame being a closed structure to take up horizontal and vertical forces and including two vertical main columns spaced from each other, a central column passing through the center of the work table, a pair of horizontal holders connected to the two main columns by means of slidable guide members and connected to the central column, and a spindle casing supported by the two holders slidably mounted between them, said spindle casing being operable within the closed structure of said three columns and having a rotary spindle with a removable milling tool thereon.

2. A milling machine according to claim 1, wherein the said holders are provided with guiding surfaces for the spindle casing and with a circular guide tube fixed longitudinally between the two holders, and in which a cylinder connected to the spindle casing is provided embraced by the circular guide tube, said cylinder serving also for hydraulic control of the spindle casing.

3. A milling machine according to claim 1, wherein the said holders are provided with guiding surfaces for the spindle casing and with a circular guide tube fixed longitudinally between the two holders, and in which a cylinder connected to the spindle casing is provided embraced by the circular guide tube, said cylinder serving also for hydraulic control of the spindle casing, and in which a piston is provided fixed to a piston rod which is connected to a member interconnecting the said two holders.

4. A milling machine according to claim 1, in which a cylinder is provided connetced to the spindle casing by an intermediate member which is rigidly connected at one end to the spindle casing and at the other end is formed as a cylinder cover connected rigidly to said cylinder.

5. A milling machine according to claim 1, in which a templet table is provided movably arranged on an overhanging member fixed to one end of the said holders, said templet table carrying a templet cooperating with a feeler bolt movably supported by a casing and actuating a hydraulic control for controlling the effect of said cylinder, said feeler bolt casing being connected to said control which is formed as an axial extension of a cover fixed at that end of the cylinder, which is turned away from the spindle casing.

6. A milling machine according to claim 1, in which a templet table is provided formed as a round table segment movably arranged on an overhanging member fixed to one end of said two holders, said templet table carrying only one templet and being guided so that the templet turns about a radius equal to that about which the workpieces on the work table turn, and in which means are provided to move the templet table in one direction at the same speed as the work table while a workpiece is being machined and in the other direction while no workpiece is in contact with the milling tool, whereby the templet table receives as many oscillations during each revolution of the work table as there are workpieces on the table.

7. A milling machine according to claim 1, in which an annular guide ring is provided on the table bed, the upper surface of the ring being provided with a circumferential recess of V-formation in cross-section in which recess a complementary rib of the work table engages.

References Cited in the file of this patent

UNITED STATES PATENTS

| Number | Name | Date |
| --- | --- | --- |
| 452,241 | Smith | May 12, 1891 |
| 1,685,572 | Onsrud | Sept. 25, 1928 |
| 1,744,362 | Carter | Jan. 21, 1930 |
| 1,755,967 | Pagani | Apr. 22, 1930 |
| 1,925,599 | Oesterlein | Sept. 5, 1933 |
| 1,934,140 | Plastaras | Nov. 7, 1933 |
| 2,250,241 | Thalmann | July 22, 1941 |
| 2,331,337 | Meyer | Oct. 12, 1943 |
| 2,345,494 | Onsrud | Mar. 28, 1944 |
| 2,355,082 | Kearney et al. | Aug. 8, 1944 |
| 2,368,870 | Pagendarm | Feb. 6, 1945 |
| 2,377,097 | Norris | May 29, 1945 |
| 2,379,870 | Barker | July 10, 1945 |
| 2,447,201 | Miller | Aug. 17, 1948 |
| 2,473,741 | Wilder | June 21, 1949 |